US008478710B2

(12) United States Patent
Andreoli et al.

(10) Patent No.: US 8,478,710 B2
(45) Date of Patent: Jul. 2, 2013

(54) ON-LINE AUTOREGRESSIVE PREDICTION IN TIME SERIES WITH DELAYED DISCLOSURE AND MONITOR SYSTEMS USING SAME

(75) Inventors: Jean-Marc Andreoli, Meylan (FR); Marie-Luise Schneider, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 375 days.

(21) Appl. No.: 12/770,922

(22) Filed: Apr. 30, 2010

(65) Prior Publication Data

US 2011/0270796 A1   Nov. 3, 2011

(51) Int. Cl.
*G06F 9/44* (2006.01)
*G06F 17/10* (2006.01)

(52) U.S. Cl.
USPC .................................. 706/52; 703/2

(58) Field of Classification Search
None
See application file for complete search history.

(56) References Cited

U.S. PATENT DOCUMENTS

| | | | | |
|---|---|---|---|---|
| 6,847,918 | B2 * | 1/2005 | Loecher | 702/184 |
| 7,660,705 | B1 * | 2/2010 | Meek et al. | 703/2 |
| 2003/0063072 | A1 * | 4/2003 | Brandenberg et al. | 345/173 |
| 2003/0101451 | A1 * | 5/2003 | Bentolila et al. | 725/34 |
| 2007/0118498 | A1 * | 5/2007 | Song et al. | 707/1 |
| 2008/0215299 | A1 * | 9/2008 | Garg et al. | 703/2 |

OTHER PUBLICATIONS

Smith, Padhraic, Hidden Markov models and neural networks for fault detection in dynamic systems, 1993.*
Shachter, Ross, Evidence absorption and propagation through evidence reversals, 1990.*
Laziridis et al, Capturing Sensor-Generated Time Series with Quality Guarantees, 2003.*
Pascal Bondon, "Influence of Missing Values on the Prediction of a Stationary Time Series," Journal of Time Series Analysis, vol. 26, No. 4, pp. 519-525, (2005).
Leisink et al., "Bound Propagation," Journal of Artificial Intelligence Research, 19:139-154, (2003).
L. Rabiner, "A Tutorial on Hidden Markov Models and Selected Applications in Speech Recognition," Proceedings of the IEEE, vol. 77, No. 2, Feb. 1989.
Abernethy et al., "A New Approach to collaborative Filtering: Operator Estimation with Spectral Regularization," Journal of Machine Learning Research, vol. 10.
V.M. Abramov et al., "Prediction of Missing Observations by a Control Method," Advances and Applications in Statistics, 8(1):109-129, (2008).
F.R. Kschischang et al., "Factor Graphs and the Sum-Product Algorithm," IEEE Transactions on Information Theory, 47(2):498-519, (2001).
P.D. Allison, "Missing Data," Sage University Papers Series on Quantitative Application in the Social Sciences, pp. 73-89, (2001).
T. Xuan, "Autoregressive Hidden Markov Model with Application in an El Nino Study," Master's thesis, University of Saskatchewan, Canada, (2005).

* cited by examiner

*Primary Examiner* — Jeffrey A Gaffin
*Assistant Examiner* — Mikayla Chubb
(74) *Attorney, Agent, or Firm* — Fay Sharpe LLP

(57) ABSTRACT

An apparatus operating on a time sequence of events includes an event handling module configured to generate a predicted label for a current observed event of the time sequence of events and a true label handling module configured to process a true label revealed for an observed event of the time sequence of events. The event handling module and the true label handling module cooperatively model stochastic dependence of a true label for the current observed event based on the time sequence of events and revealed true labels for the past observed events of the time sequence of events. The event handling module and the true label handing module operate asynchronously. The event handling module and the true response handling module suitably operate as one or more digital processors.

21 Claims, 4 Drawing Sheets

| Yn-r | Yn | $\delta_n - \delta_{n-1}$ | Non null cell pattern in $\omega_n$ |
|------|-----|------|------|
| ¬⊥ | ¬⊥ | 0 | u, u |
| ¬⊥ | ⊥ | 1 | u, uy |
| ⊥ | ¬⊥ | -1 | yu, u |
| ⊥ | ⊥ | 0 | yu, uz |

*FIG. 4*

ON-LINE AUTOREGRESSIVE PREDICTION IN TIME SERIES WITH DELAYED DISCLOSURE AND MONITOR SYSTEMS USING SAME

BACKGROUND

The following relates to the time series processing arts, monitoring arts, control arts, and related arts.

In system monitoring applications, events are recorded as a function of time. Events may occur on a predetermined schedule, such as a diagnostic sub-system that produces a diagnostic report (i.e., event) at regular intervals. Additionally or alternatively, events may occur at random or pseudo-random times, such as a manual or automatic report of a detected component malfunction.

When an event is received, it is desirable to rapidly determine or predict an appropriate response (which in some instances may be no response at all). In one way of viewing the problem, the event is classified with the output of the classifier being the predicted response. The predicted appropriate response is implemented (in the case of "no response at all" the "implementation" is to do nothing). Eventually, the correctness or incorrectness of the predicted response (that is, the "true" response) is determined.

To provide a more concrete example, consider a help desk maintained by a printing system manufacturer. The events in this case correspond to manual or automatic reports of printing system malfunctions or, more generally, manual or automatic reports of apparently anomalous printing system behavior. In some embodiments, the predicted response can be modeled as a binary decision: either "investigate" or "do nothing". The "true" response is later determined.

In the case of a predicted response of "investigate", if the investigation results in some remedial action then the predicted response of "investigate" was correct (that is, the true response was indeed "investigate"). On the other hand, if the investigation results in no remedial action then the predicted response of "investigate" was not correct (that is, the true response was "do nothing" which would have been the more efficient response).

In the case of a predicted response of "do nothing" if no further indication of a problem is received over a sufficiently long period of time then the predicted response of "do nothing" can be assumed to have been correct. On the other hand, if subsequent events (e.g., subsequent reports of the same or similar anomalous printing system behavior) ultimately result in some remedial action being taken, then the predicted response of "do nothing" was incorrect (that is, the true response was "investigate").

In some such actual help desk operations, it has been found that the true response was "do nothing" in up to 80% of all cases. On the other hand, it is not advisable to "do nothing" in response to a customer or client reporting a genuine problem. Thus, efficient prediction of the appropriate response can result in a large improvement in efficiency of help desk operation.

It can be advantageous to adjust the predictor or classifier based on the true responses, so as to increase accuracy. Toward this end, an "immediate disclosure" assumption is sometimes made, whereby it is assumed that the true response is known shortly after issuance of the predicted response, and before receipt of the next event. The immediate disclosure assumption is computationally convenient—however, it is not realized in many practical system monitors. In the illustrative printing system help desk application, for example, the immediate disclosure assumption may or may not hold in a particular instance in which the predicted response was "investigate", depending upon how rapidly the investigation is concluded compared with the time interval to the next event. The immediate disclosure assumption generally does not hold when the predicted response is "do nothing", because the true response is not known in those instances until some time passes in order to determine whether subsequent events do or do not report the same or a similar problem.

The following discloses methods and apparatuses for system monitoring and other time series processing which accommodate delayed disclosure.

BRIEF DESCRIPTION

In some illustrative embodiments disclosed as illustrative examples herein, an apparatus operating on a time sequence of events comprises: an event handling module configured to generate a predicted label for a current observed event of the time sequence of events; and a true label handling module configured to process a true label revealed for an observed event of the time sequence of events. The event handling module and the true label handling module cooperatively model stochastic dependence of a true label for the current observed event based on observed events of the time sequence of events and revealed true labels for past observed events of the time sequence of events. The event handling module and the true label handling module operate asynchronously. The event handling module and the true response handling module are suitably embodied by one or more digital processors.

In some embodiments of the apparatus set forth in the immediately preceding paragraph, the event handling and true label handling modules cooperatively model stochastic dependence of a true label for the current observed event based on observed events of the time sequence of events and any true labels revealed for r past observed events of the time sequence of events. In some such embodiments, the model comprises nodes corresponding to past observed events of the time sequence of events for which the true labels have not yet been revealed, and the true label handling module responds to a revelation of a true label for a past observed event by a process including removing the node corresponding to the past observed event and propagating information of the removed node to other nodes corresponding to neighboring events in the time sequence of events, for example using a forward-backward algorithm.

In some illustrative embodiments disclosed as illustrative examples herein, a storage medium stores instructions executable on a digital processor to perform a method of modeling stochastic dependence of a true label of a current observed event of a time sequence of events using an autoregressive model of order r. The method includes performing an operation (i) comprising adding a node corresponding to a current observed event to the autoregressive model and generating a predicted label for the current observed event using the autoregressive model and performing an operation (ii) comprising removing a node of the autoregressive model corresponding to a past observed event for which a true label is revealed and propagating information of the removed node to other nodes of the autoregressive model, wherein the operations (i) and (ii) are performed asynchronously.

In some illustrative embodiments disclosed as illustrative examples herein, a method operating on a time sequence of events comprises: (i) generating a predicted label for a current observed event of the time sequence of events; and (ii) processing a true label revealed for an observed event of the time sequence of events. The operations (i) and (ii) cooperatively maintain an autoregressive model of the time sequence of events including the current observed event, past observed events, and revealed true labels for past observed events. The operation (i) generates the predicted label for the current observed event without requiring that the true labels for all past observed events have been revealed. The operations (i) and (ii) are suitably performed by a digital processor.

In some embodiments of the method set forth in the immediately preceding paragraph, the operations (i) and (ii) cooperatively implement a stationary or nonstationary autoregressive model generating the predicted response, the autoregressive model being of order r where r determines a number of previous predicted responses retained by the autoregressive model. In some embodiments of the method set forth in the immediately preceding paragraph, the operation (ii) employs a forward-backward update algorithm in updating the time sequence of events based on the received true response.

BRIEF DESCRIPTION OF THE DRAWINGS

FIG. 4 shows a table indicating possible transition matrix configurations and their dependency on knowledge of true responses for events of the time sequence of events.

DETAILED DESCRIPTION

In the following, predictive monitoring systems are disclosed, which monitor a time series of events for which labels are subsequently assigned in an asynchronous and generally delayed fashion. In illustrative examples, system monitoring systems make a prediction of the appropriate response to an event. The predicted response is carried out substantially immediately, and the true response (that is, the objectively "correct" response that should have been taken) is revealed at some later time after the event is received. For these illustrative system monitoring systems the true labels are the true (i.e., objectively correct) responses, and the predicted labels are the predicted responses.

More generally, the monitoring system observes events, and some kind of label is assigned to the event at some later time in an asynchronous and generally delayed fashion. The subsequently assigned label is the true (i.e., correct) label. The predictive monitoring system models the time sequence of events and the revealed true labels (where in general at any given point in time not all true labels will yet have been revealed for all observed events). The model is used to assign (i.e., predict) a predicted label for each newly observed event at the time it is observed.

Such a predictive monitoring system has diverse applications beyond the illustrative example of a system monitor for predicting appropriate responses to potential equipment malfunction events. By way of some further illustrative examples, the disclosed techniques are also useful in applications such as an automated news monitoring service. In this application, the event observations are received news articles, suitably represented as document keywords or so forth. The label for an observed article is a metric of the relevance of the article to a client. For example, the set of possible labels may be {"very relevant", "relevant", "not relevant"}. The predicted label is the relevance assigned to a newly received article by the news service, and the true label is revealed at some later time, for example in response to feedback provided by the client.

In the following, the term "label" will be used. The "true label" is the true (that is, correct) label for an observed event which is revealed in a generally delayed fashion. The "predicted label" is the immediately made prediction of the label generated using the model.

Figure 1:
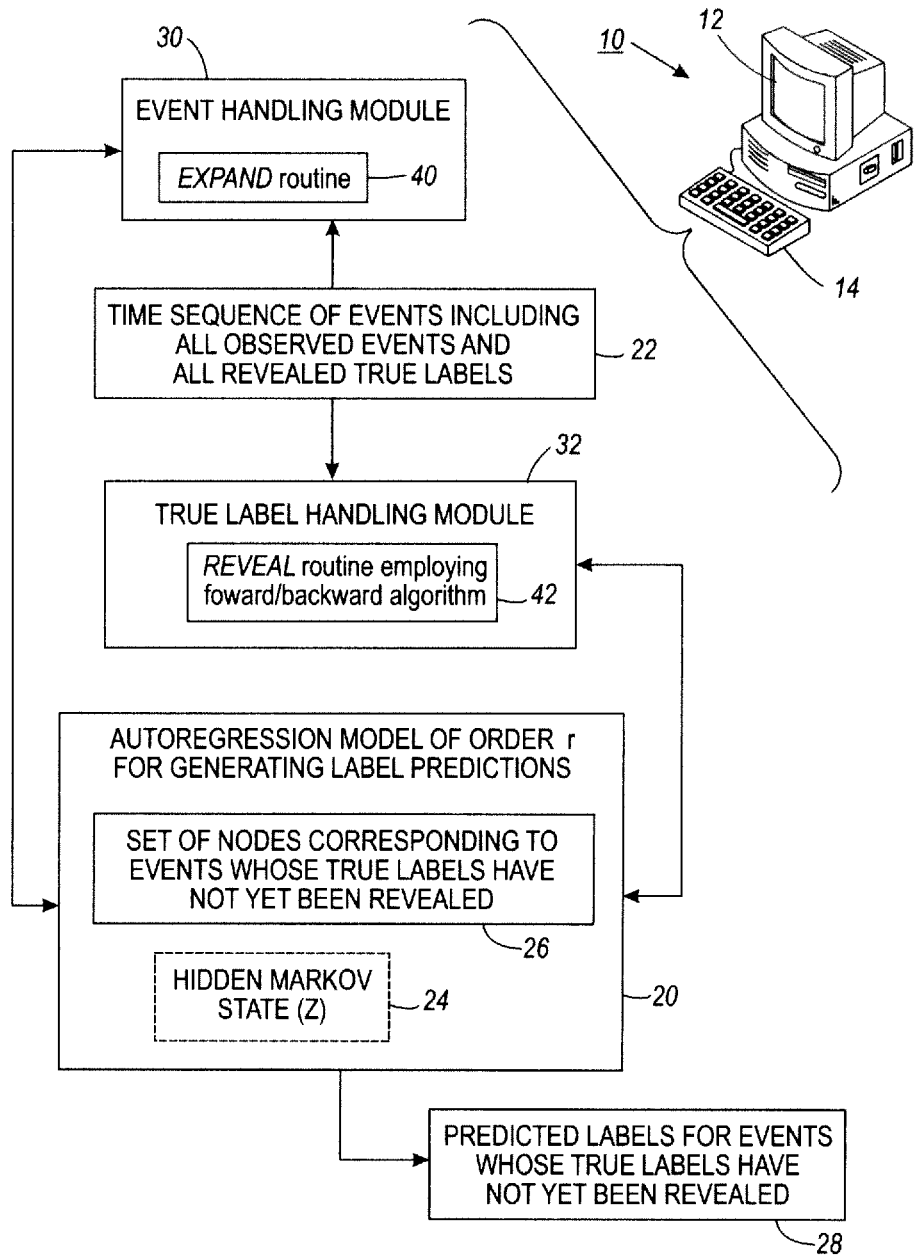
FIG. 1 diagrammatically shows an illustrative system monitor.

With reference to FIG. 1, an illustrative system monitor is embodied by a computer 10. The system monitor receives or observes events forming a time sequence of events and outputs predicted labels for newly received events as well as revised label predictions for past events for which the true labels have not been revealed yet. The illustrative computer 10 includes user interfacing components, namely an illustrated display 12 and an illustrated keyboard 14. Other user interfacing components may be provided in addition or in the alternative, such as mouse, trackball, or other pointing device, a different output device such as a set of LED indicators, or so forth. In some contemplated embodiments there are no human user input devices, and all inputs (for example, events) are received via a digital data network. Similarly, in some contemplated embodiments there are no directly human-perceptible outputs but rather the output is to a digital network that includes another device that utilizes the predicted labels.

The illustrative computer 10 is an illustrative embodiment of a digital processor or digital processing device, and can alternatively be embodied by a network server, dedicated electronic system monitor component, or other digital processor or processing device. The digital processor or digital processing device may include a single-core processor chip, a multi-core processor chip, a parallel arrangement of multiple cooperating processor chips, a graphical processing unit (GPU), a microcontroller, various combinations thereof, or so forth, and further may include random access memory (RAM), read-only memory (ROM), or other memory element(s), and further may include other auxiliary components such as suitable electronic circuitry for power delivery, digital communications, data access and storage, auxiliary digital logic, and so forth.

With continuing reference to FIG. 1, the computer 10 or other digital processor or processing device is configured to implement a system monitor that receives and stores a time sequence of events and generates a predicted label for each newly received event as well as a revised label predictions for past events whose true labels have not yet been revealed. The system monitor also receives "true" labels, that is, the objectively correct label for an event, as these true labels are revealed. However, there is generally some time latency between receipt of a new event and later receipt of the true label for that event—that is, there is generally a delayed disclosure of the true label for a given event.

In illustrative embodiments shown herein, the monitoring system determines whether to investigate an event. For this application, the predicted label is a binary value, the true label is also a binary value, and the predicted labels and the true labels have values selected from a binary group of values consisting of (i) a value corresponding to an investigation response and (ii) a value corresponding to a response of doing nothing. These illustrative embodiments are useful, for example, in the case of a system monitor for monitoring a network of printing devices or other equipment in which observed events correspond to reports of potential equipment malfunctions in which the label can be either to investigate the reported malfunction or to not investigate (i.e., do nothing). More generally, the predicted and true labels are discrete and have values selected from a group of N possible values, where N is an integer greater than or equal to two. Again more generally, the monitored entity may broadly include, by way of some illustrative examples: devices or other equipment; human crews, teams, police cruisers, or other mobile units of equipped human personnel; an electronic network or the Internet or portions thereof; a network of computers; an electrical power grid; or so forth.

With continuing reference to FIG. 1, the system monitor utilizes an autoregressive model 20 of order r, which operates on a time sequence of events 22 including all observed events and the true labels for those events which have been revealed. In some embodiments (see, e.g., diagrammatic depictions shown in FIGS. 2A and 2B) the autoregressive model 20 is a stationary autoregressive model of order r with deterministic emissions. In some embodiments (see, e.g., diagrammatic depictions shown in FIGS. 3A and 3B) the autoregressive model 20 is an adaptive nonstationary autoregressive model of order r including a discrete latent state 24 denoted herein as the discrete latent random state variable Z.

In some illustrative embodiments disclosed herein as examples, the autoregressive model employs a model representation comprising a set of nodes 26 that is constructed as follows. As each new event is observed, a corresponding node is added to the set of nodes 26. The node contains information used in computing the predicted label for the newly observed event and for all previously observed events for which a true label has not yet been revealed. When a true label is revealed for an observed event, the node corresponding to the observed event is discarded, and information contained in the discarded node is propagated to neighboring nodes.

The autoregressive model 20 describes the ground truth, that is, describes how the observed events and their revealed true labels are actually related, in a stochastic sense. The autoregressive model 20 models how a true response is stochastically dependent on the current and all previous events and the r previous true responses (which may or may not yet have been revealed). The autoregressive model 20 is used to generated predicted labels 28 for events whose true labels have not yet been revealed. In this way, a predicted label for a newly observed event is generated immediately (or close to immediately) after its observation. In the illustrative system monitoring application in which events are potentially indicative of a malfunction, for example, this predicted response for a newly observed event is used to make the immediate decision as to whether the event should be investigated or ignored.

The time sequence of events 22 including the observed events and the revealed labels is optionally stored by the monitoring system, for example as an events log (not shown). Logging the time sequence of events 22 is typically desirable for a monitoring application in order to provide a record of the events for later inspection. However, it is also contemplated to discard the observed events and revealed true labels, as the information sufficient for label prediction is stored in the set of nodes 26 and, in the case of a nonstationary autoregressive model, in the discrete latent state Z 24.

In a monitoring system that employs an immediate disclosure assumption, a synchronous workflow can be used, which alternates between two steps: ($i^{immediate}$) an event is received: it is stored and its label is predicted; and ($ii^{immediate}$) its label is (immediately) revealed and is stored for future predictions.

The system monitor embodiments disclosed herein do not employ the immediate disclosure assumption—rather, they allow for delayed disclosure.

With continuing reference to FIG. 1, toward this end the system monitor includes an event handling module 30 and a true label handling module 32. To accommodate delayed disclosure, in the system monitor of FIG. 1 the event handling module 30 and the true label handling module 32 operate asynchronously. In other words, the steps ($i^{immediate}$) and ($ii^{immediate}$) of the monitoring system employing the immediate disclosure assumption are replaced by operations (i) and (ii) which are performed asynchronously, and the processing performed in each operation is modified to enable the first operation to assign a predicted label for a new event without requiring that the second operation has received true labels for all previous events in the time sequence of events. The operation (i) is performed when a new event is received or observed. In operation (i), the event handling module 30 stores the new event, predicts its label (that is, assigns a predicted label for the new event), and the predictions of all the previous events for which the true label (that is, true response) has not been revealed yet are updated as appropriate based on the new event and last r true labels. The operation (ii) is performed whenever a true label is received (that is, revealed). In operation (ii), the true label handling module 32 receives the true label of a previous event (not necessarily the last one), and the predictions of all the other events for which the true label has not been revealed yet are revised.

The operations (i) and (ii) are performed asynchronously in the system monitor of FIG. 1. The operation (i) is performed by the event handling module 30 responsive to receipt of a new event. The operation (ii) is performed by the true label handling module 32 responsive to (generally delayed) revelation of a true label for a previously observed event. Because delayed disclosure is permitted by the system monitor of FIG. 1, the operations (i) and (ii) are not necessarily performed in alternating fashion.

In illustrative examples set forth herein, $X_n$ is a random variable describing the $n^{th}$ observed event. The random variable $X_n$ can include any number of discrete and/or continuous components. By way of the aforementioned illustrative example of a help desk maintained by a printing system manufacturer, the components of the $n^{th}$ event $X_n$ can include, for example, results of self-diagnosis procedures on the device, counts, sensor readings, delays, or so forth. In the case of a news monitoring application in which events correspond to received news articles, the event $X_n$ can be a "bag of words" representation of the $n^{th}$ received news article in which the components of the bag-of-words vector $X_n$ are word counts for keywords of interest for the news monitoring.

Let $Y_n$ denote the class label or value of the $n^{th}$ event. The class label or value $Y_n$ can range over any finite set $\mathcal{Y}$ of classes. In the illustrative example, the possible responses are "investigate" or "do nothing"—more generally, however, the finite set $\mathcal{Y}$ of classes may include two, three, four, or more possible label values. By way of example, in a security system the possible labels represent responses to a security-related event, and may include labels for responses such as "do nothing" and several progressively more urgent "investigate" levels. By way of another example, in the aforementioned news monitoring application the finite set $\mathcal{Y}$ of classes may include an "ignore article" value and a set of progressively higher priority level values. In this way, a human reviewer is informed both of which articles should be manually reviewed and in what priority ordering. By way of still yet another example, in a satellite control system each class label may include a vector [x,y,z] where the components x, y, and z denote impulse levels for three orthogonal control rockets. In this case the finite set $\mathcal{Y}$ of classes resides in a three-dimensional vector space. If each control rocket is either on (value "1") or off (value "0"), then the finite set $\mathcal{Y}$ of classes includes eight classes: {[0,0,0], [0,0,1], [0,1,0], [0,1,1], [1,0,0], [1,0,1], [1,1,0], [1,1,1]}. In some more complex variants, there may be more than three control rockets, and/or each control rocket may have multiple assignable values, for example "0" for off, and "0.25", "0.50", "0.75", and "1.00" for one-quarter, one-half, three-quarters, and full power, respectively.

Let N be the index of the last event and for each n=1:N let $y_n$ be the observed label (that is, the true label) of the $n^{th}$ event, if it has been revealed. If the label for the $n^{th}$ event has not (yet) been revealed, then $y_n = \perp$ where the notation "$\perp$" denotes the true label is not (yet) known. Let I be the set of event indices for which the true label is known. In other words, n∈I iff $y_n \neq \perp$.

It is desired that the system monitor compute, for each n such that $y_n = \perp$, the probability $p(Y_n | Y_I X_{1:n})$ which is a vector of $[0,1]^{\mathcal{Y}}$. Rather than computing a true probability, however, it is operatively equivalent for the system monitor application to compute any non-normalized score vector proportional to $p(Y_n | Y_I X_{1:n})$. In this case, the proper probabilities $p(Y_n | Y_I X_{1:n})$ are suitably obtained by normalisation, for example from the score vector $p(Y_n | Y_I X_{1:n})$ or the score vector $p(Y_n | Y_I X_{1:n})$.

In the illustrative examples set forth herein, in the autoregression model 20 $Y_n$ follows an autoregressive model of fixed, finite order r, where without loss of generality the order r is an integer. Said another way, the autoregressive model 20 is of order r where r determines a number of previous true labels retained by the autoregressive model. Embodiments in which the autoregressive model 20 is stationary are disclosed, as shown by way of example in FIGS. 2A and 2B. Embodiments are also disclosed in which the autoregressive model 20 is nonstationary and evolves in time through the latent state 24, denoted herein as Z, which is suitably assumed to follow a Markovian dynamic. To permit delayed disclosure, the true label handling module 32 implements a forward-backward algorithm to update the set of nodes 26 based on the received true label. The update includes removing the node corresponding to the newly revealed true label and propagating information from the removed node to the remaining neighboring nodes of the set of nodes 26. The forward-backward algorithm is a probabilistic inference technique employed for the propagation in illustrative embodiments disclosed herein, and is tuned in examples set forth herein to work "on the fly", that is, in real time or pseudo-real time when both events and (true) class label disclosures occur asynchronously.

Figure 2A:
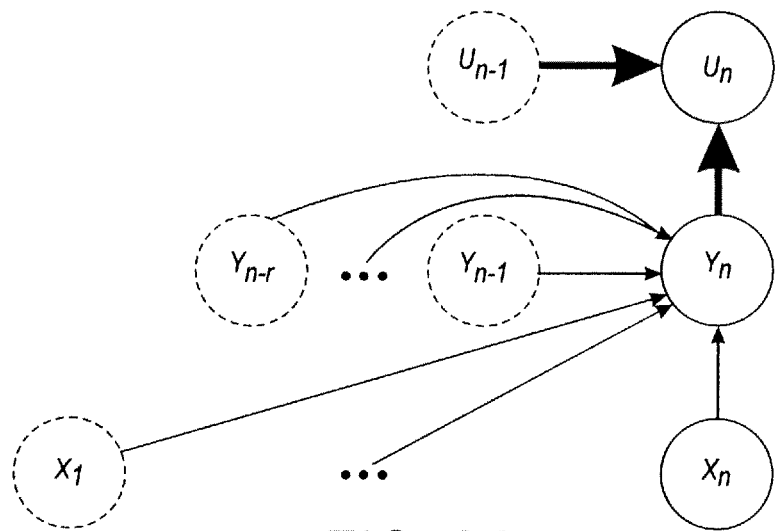
FIG. 2A diagrammatically shows a stationary autoregressive model of order r with deterministic emissions that is suitably implemented by the system monitor of FIG. 1.
Figure 2B:
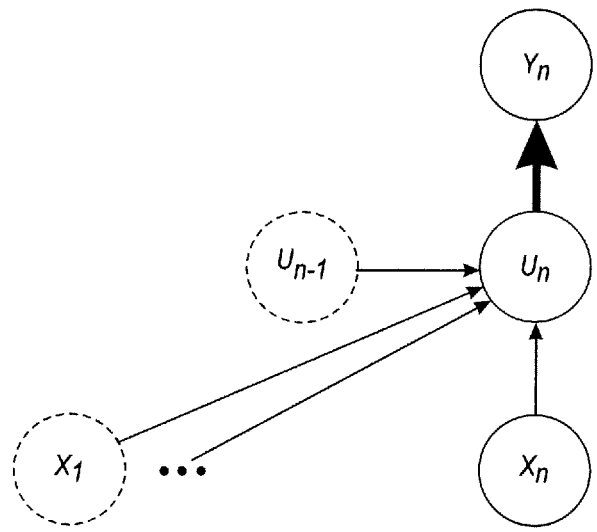
FIG. 2B diagrammatically shows the stationary autoregressive model of FIG. 2A, in which the time sequence of responses is represented as a conditional Markov chain, conditioned on the sequence of events.

With reference to FIGS. 2A and 2B, embodiments in which the autoregressive model 20 is stationary are illustrated and described. FIG. 2A depicts a stationary autoregressive model of order r, in which the dependency of the true label $Y_n$ over its past is limited to all the past and present events $X_{1:n}$, and only the r previous true labels $Y_{n-r:n-1}$. The model can be written in a parameterized form as $P(Y_n | X_{1:n} Y_{1:n-1}) = \phi(X_{1:n}, Y_{n-r:n}, Y_n)$. An autoregressive model of order r can be transformed into a model of order 1 by aggregating the variables. To implement this transformation, let $U_n = (Y_{n-r+1}, \ldots, Y_n)^T$, the random vector of the labels of the r events prior or equal to the $n^{th}$ event. This random vector is included in the stationary autoregressive model as shown in the graphical model of FIG. 2B using a using a deterministic dependency (indicated by double line arrows in FIG. 2B) of $U_n$ on $Y_n$ and $U_{n-1}$ (since $U_n = ((U_{n-1})_{2:r}{}^T Y_n)^T$). By rewriting and simplifying the joint probability, the autoregressive model can be transformed into the equivalent model of FIG. 2B which contains only an autoregression of order 1, but now on the aggregated variable $U_n$. It is a conditional Markov chain model with deterministic emissions, to which the forward-backward inference procedure can be applied as disclosed herein.

It is recognized that $U_n$ resides in $\mathcal{Y}^r$, but since many of its components may be known, $U_n$ can be configured to range over a variable size set representing exactly the unknown components in $U_n$. More precisely, for each event index n, let v(n) be the number of events up to the $n^{th}$ event (included) for which the true label is unknown. Mapping v is non-decreasing. Let $\delta_n = v(n) - v(n-r)$, which counts the events after n−r (excluded) up to n (included) for which the true label is missing. A sequence $u \in \mathcal{Y}^{\delta_n}$ can therefore be seen as an assignment of those missing labels and can be extended into a full assignment written $u^{(n)} \in \mathcal{Y}^r$ for all the events after n−r up to n, i.e. a possible value of $U_n$: for $1 \leq k \leq r$ of the form: $u_k^{(n)} =_{def} y_{n-r+k}$ if $y_{n-r+k} \neq \perp$ else $u_{v(n-r+k)-v(n-r)}$. In other words, $u^{(n)}$ is the value of $U_n$ in which the sequence u is used to fill the holes as they appear when the components of $U_n$ are enumerated. To apply the forward-backward algorithm, for each n∉I and $y \in \mathcal{Y}$:

$$p(Y_n = y, Y_I | X_{1:N}) = \sum_{u \in \mathcal{Y}^{\delta_n}, last(u)=y} p(U_n = u^{(n)}, Y_I | X_{1:N}), \quad (1a)$$

$$P(U_n = u^{(n)}, Y_I | X_{1:N}) = p(U_n = u^{(n)}, Y_{(1:N) \cap I} | X_{1:N}) p \quad (1b)$$
$$(Y_{(n+1:N) \cap I} | U_n = u^{(n)}, X_{1:N})$$
$$= \alpha_n(u) \beta_n(u),$$

where:

$$\alpha_n(u) =_{def} p(U_n = u^{(n)}, Y_{(1:n) \cap I} | X_{1:N}) \quad (2)$$

and $$\beta_n(u) =_{def} p(Y_{(n+1:N) \cap I} | U_n = u^{(n)}, X_{1:N}) \quad (3)$$

The two vectors $\alpha_n$ and $\beta_n$ reside in the space $[0,1]^{\mathcal{Y}^{\delta_n}}$, and can be computed by induction using an inhomogenous transition matrix $\omega_n$ which belongs to the space $[0,1]^{\mathcal{Y}^{\delta_{n-1}} \times \mathcal{Y}^{\delta_n}}$ and is defined by:

$$\omega_n(u, u') = p(U_n = u'^{(n)} | U_{n-1} = u^{(n-1)}, X_{1:N}) \quad (4)$$
$$= I\{u_{1:r-1}'^{(n)} = u_{2:r}^{(n-1)}\} \phi(x_{1:n}, u^{(n-1)} u_r'^{(n)}).$$

A decomposition of the probabilities defining $\alpha_n$ and $\beta_n$ leads to (generalized) inductive formulas: for any $m \leq n$:

$$\alpha_n = \omega_n^T \alpha_{n-1} \rightarrow \alpha_n = \left( \prod_{m < l \leq n} \omega_l \right)^T \alpha_m \quad (5)$$

and $$\beta_{n-1} = \omega_n \beta_n \rightarrow \beta_m = \left( \prod_{m < l \leq n} \omega_l \right) \beta_n. \quad (6)$$

These formulas are similar to those of a standard hidden Markov model (HMM), except that here the "state" space changes at each step, hence the transition matrices are rectangular. The state space is inhomogeneous and non-stationary in that the space at some steps is revised each time the true label of some event is revealed.

The transition matrix $\omega_n$ defined in Equation (4) has dimension $\mathcal{Y}^{\delta_{n-1}} \times \mathcal{Y}^{\delta_n}$, which can be up to $\mathcal{Y}^r \times \mathcal{Y}^r$. However, the transition matrix $\omega_n$ is relatively sparse, in that a transition matrix $\omega_n$ does not have more than $|\mathcal{Y}|$ non-null components on each row and each column. More precisely, the shape of the matrix depends on whether or not indices n and n−r are in I.

With reference to FIG. 4, a table is shown which sets forth the possible cases for the transition matrix $\omega_n$. For example, the terms $(\bot, \neg \bot)$ in the third row of the table of FIG. 4 means that if the true label is unknown at the node n−r but is known at the node n, then $\delta_n$ is $\delta_{n-1}-1$. Indeed, the unknown $Y_{n-r}$ present in $U_{n-1}$ disappears in $U_n$ while the known $Y_n$ absent from $U_{n-1}$ appears in $U_n$, hence there is one unknown less in $U_n$ than in $U_{n-1}$. The matrix $\omega_n$, indexed by $\mathcal{Y}^{\delta_{n-1}} \times \mathcal{Y}^{\delta_n}$ will have null values outside the cells indexed by yu, u for any $y \in \mathcal{Y}$ and $u \in \mathcal{Y}^{\delta_n}$.

One efficient implementation may choose to code each index $u \in \mathcal{Y}^{\delta_n}$ as the whole number expressed by u in the basis $|\mathcal{Y}|$ (where the "digits" of $\mathcal{Y}$ are arbitrarily mapped into $0, \ldots, |\mathcal{Y}|-1$). Multiplying $\omega_n$ by a vector or a matrix then amounts to performing basic index manipulations inside that vector or matrix, then multiplying termwise with the appropriate values computed from $\phi$.

In order to ensure that the autoregression can bootstrap, it is assumed that r consecutive events have been received and their labels revealed. The state of the system at any given time is given by the number $N \geq r$ of events already received, and, for each n=r:N, a node holding: the number v, of missing labels at nodes prior or equal to n; the vectors $\alpha_n$ and $\beta_n$ and their (log-) dimension $\delta_n$; the label $y_n$ at node n, if it is known, otherwise $y_n = \bot$; and the transition matrix $\omega_n$. A property of these quantities is that they can be computed by incremental updates.

With reference to FIG. 1 and with further reference to Algorithms (E1) and (R1), initially N=r, and there is a single node with $\delta_r = v_r = 0$ and $\alpha_r$ reduced to a vector of dimension 1, which can therefore be set arbitrarily (since it is defined up to a multiplicative scalar). As for $\beta_r$ and $\omega_r$, they are not used. Updates are then performed by two routines whose pseudocode is shown in Algorithms (E1) and (R1), namely an EXPAND routine or procedure 40 suitably performed by the event handling module 30, and a REVEAL routine or procedure suitably performed by the true label handling module 32, of the system monitor of FIG. 1. The REVEAL routine 42 employs a forward-backward algorithm as disclosed herein to update the set of nodes 26 based on a newly received (i.e., revealed) true label.

---

Algorithm (E1)

Procedure EXPAND( )
    create a new node N'= N + 1
    set $v_{N'} = v_N + 1$
    set $\delta_{N'} = \delta_N$ if $y_{N+1-r} = \bot$ else $\delta_N + 1$
    set $\omega_{N'}$ = as specified by Equation (4)
    set $\alpha_{N'} = \omega_{N'}^T \alpha_N$
    set $\beta_{N'} = (1 \ldots 1)^T$
    set $y_{N'} = \bot$
    set N = N'

---

Algorithm (R1)

Procedure REVEAL(m,y)
    set $y_m = y$
    for n = m up to N repeat :    # forward propagation
        if n < m + r :
            let $i = v_m - v_n + \delta_n$
            remove each column of $\omega_n$, each row of $\omega_{n+1}$ (if n < N),
                as well as each component of $\alpha_n$ and $\beta_n$, the
                index of which does not match $y_m$ at position i
            reindex those which match $y_m$ at position i , by just
                removing position i (occupied by $y_m$ ) in the index;
                if indices in $\mathcal{Y}^{\delta_n}$ are coded as numbers in basis $|\mathcal{Y}|$,
                then this reindexation is implicit
            decrease $\delta_n$ by 1
        else if n < N;
            set $\alpha_n = \omega_n^T \alpha_{n-1}$
        decrease $v_n$ by 1
    for n = m down to r + 1 repeat :   # backward propagation
        set $\beta_{n-1} = \omega_n \beta_n$

---

When a new event arises, the EXPAND routine 40 is executed. Line 5 of the illustrative EXPAND routine of Algorithm (E1) uses Equation (4) and the value of $\omega_{N'}$ computed at line 4 to initialize the new score vector $\alpha_{N'}$. The score vector $\beta_{N'}$ is initialized by the operation set $\beta_{N'} = (1 \ldots 1)^T$ with 1 at every component. These operations are consonant with Equations (2) and (3).

When the previously unrevealed true label of an event m is revealed to be y, the routine REVEAL(m,y) as set forth in Algorithm (R1) is executed. A forward propagation is performed by the operation set $\alpha_n = \omega_n^T \alpha_{n-1}$ of the REVEAL pseudocode of Algorithm (R1) to update the score vectors $\alpha_n$ at or after m+r using Equation (5), and a backward propagation is performed to update the score vectors $\beta_n$ before m using Equation (6). Between m and m+r−1, the updates can be done directly by index manipulations, as per the remove, reindex, and decrease operations of the REVEAL pseudocode of Algorithm (R1).

When the (log-)dimension $\delta_n$ of a node becomes null (i.e. its dimension $\mathcal{Y}^{\delta_n}$ becomes 1), $\alpha_n$ and $\beta_n$ become scalars, and, since they are defined up to a multiplicative scalar, their values become irrelevant. At such nodes, the chain of events 1:N can be broken into two independent segments. The breakpoint is characterized by the fact that r consecutive labels have been revealed.

The values of $\alpha_n$ and $\beta_n$ are used to compute $p(Y_n = y, Y_I | X_{1:N})$, as expressed in Equation (1), only when the label of node n is unknown (that is, when $y_n = \bot$). Accordingly, the nodes corresponding to known labels can be removed, except the last label for the last node which is kept for expansions.

With returning reference to FIG. 1, these observations can be used to construct alternative embodiments of the EXPAND and REVEAL routines 40, 42 that provide enhanced computational efficiency. In these alternative embodiments, each node n holds two additional pieces of information, namely indices $\pi_n^+$ and $\pi_n^-$. The index $\pi_n^+$ is defined as the index of the closest node after n whose label is unknown, when it exists; otherwise, $\pi_n^+ = \bot$. The index $\pi_n^-$ is defined as the index of the closest node before n whose label is unknown, when it exists; otherwise $\pi_n^- = \bot$. Hence $y_{\pi_n^+} = y_{\pi_n^-} = \bot$ and $y_m \neq \bot$ for all m such that $\pi_n^- < m < n$ or $n < m < \pi_n^+$. Furthermore, by construction, if $y_n = \bot$ then $\pi_{\pi_n^+}^- = \pi_{\pi_n^-}^+ = n$. Thus, $\pi_n^+$ and $\pi_n^-$ point to the following and preceding neighbors of node n in the chain of important nodes (where an important node is one for which the label is unknown). Furthermore, each node n in this embodiment holds a matrix $\Omega_n$ instead of $\omega_n$, were the matrix $\Omega_n$ is defined as $\Omega_n =$ $\Pi_{\pi_n^- < m \leq n} \omega_m$. Hence, using the generalized induction set forth in Equations (5) and (6), propagation directly between neighbors can be expressed as $\alpha_n = \Omega_n^T \alpha_{\pi_n^-}$ and $\beta_{\pi_n^-} = \Omega_n \beta_n$. The updates of $\Omega_n$, $\pi_n^+$ are $\pi_n^-$ done incrementally, and only for the relevant nodes, namely the last node and those important nodes for which the label is unknown. Initially, n=r and $\pi_r^- = \pi_r^+ = \perp$ and $\Omega_r$ is not used.

Algorithms (E2) and (R2) set forth suitable pseudocode implementing these alternative embodiments of the EXPAND and REVEAL routines 40, 42, respectively, that provide enhanced computational efficiency. In the alternative EXPAND routine of Algorithm (E2), the if and else expressions correspond to the case where the label at N is, respectively, known and unknown. In the former case, the node N is discarded, while in the latter case the new node N' becomes its following neighbor. In both cases, $\omega_{N'}$ is given by Equation (4). At the last line of the alternative EXPAND routine 40 of Algorithm (E2), the neighboring links are updated.

---

Algorithm (E2)

---

Procedure EXPAND( )
    create a new node N'= N + 1
    set $v_{N'} = v_N + 1$
    set $\delta_{N'} = \delta_N$ if $y_{N+1-r} = \perp$ else $\delta_N + 1$
    set $\omega_{N'}$ as specified by Equation (4)
    set $\alpha_{N'} = \omega_{N'}^T \alpha_N$
    set $\beta_{N'} = (1...1)^T$
    set $y_{N'} = \perp$
    if $v_{N'} = v_{\pi_N^-}$ : set $\pi_{N'}^- = \pi_N^-$; set $\Omega_{N'} = \Omega_N \omega_{N'}$; discard node N
    else : set $\pi_{N'}^- = N$ ; set $\Omega_{N'} = \omega_{N'}$
    set N = N' ; set $\pi_{\pi_N^-}^+ = N$ ; set $\pi_N^+ = \perp$

---

Algorithm (R2)

---

Procedure REVEAL(m,y)
    for n = m while n ≠ ⊥ repeat:    # forward propagation
        if n < m + r:
            let $i = v_m - v_n + \delta_n$
            remove each column of $\Omega_n$, each row of $\Omega_{\pi_n^+}$ (if n < N),
                as well as each component of $\alpha_n$ and $\beta_n$, the
                index of which does not match $y_m$ at position i
            reindex those which match $y_m$ at position i, by just
                removing position i (occupied by $y_m$) in the index
            decrease $\delta_n$ by 1
        else if n < N;
            set $\alpha_n = \Omega_n^T \alpha_{\pi_n^-}$
        decrease $v_n$ by 1
        let $n = \pi_n^+$
    if m < N:   # node elimination
        set $\pi_{\pi_m^-}^+ = \pi_m^+$
        set $\Omega_{\pi_m^+} = \Omega_m \Omega_{\pi_m^+}$
        if $\pi_m^- \neq \perp$ : set $\pi_{\pi_m^-}^+ = \pi_m^+$
        discard node m
    for n = m while n > r repeat :   #backward propagation
        set $\beta_{\pi_n^-} = \Omega_n \beta_n$
        let $n = \pi_n^-$

---

In the alternative REVEAL routine of Algorithm (R2), the propagations from node n follow the neighboring links $\pi_n^+$ (let $n=\pi_n^+$) and $\pi_n^-$ (let $n=\pi_n^-$), rather than following n+1 and n−1 as per the REVEAL routine of Algorithm (R1). When the revealed node is not the last node, it is removed and the neighboring nodes are updated with respect to their fields $\pi^-$ and $\pi^+$.

In the alternative approach of Algorithms (E2) and (R2), the criterion for identifying when the chain can be broken is modified. The criterion is no longer based simply on the fact that some $\delta_n$ of an existing node becomes null, since that may invisibly happen at a discarded node. Instead, an equivalent criterion is used: break the chain at m, when its label is revealed, if $\pi_m^+ - \pi_m^-$ (that is, the interval between the two new neighbors) becomes greater than r.

The foregoing embodiments have employed the autoregressive model 20 as a stationary autoregression model such as that shown in FIGS. 2A and 2B, in which the same parameter φ is used at each step. In these stationary autoregression model embodiments, the hidden state (Z) 24 is not used.

Figure 3A:
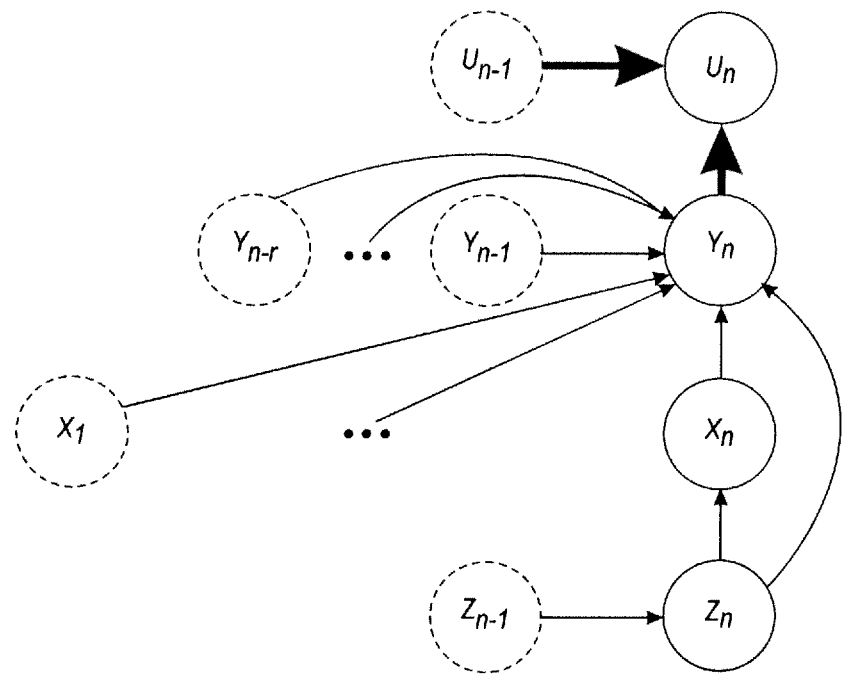
FIG. 3A diagrammatically shows an adaptive nonstationary autoregressive model of order r including a discrete latent state Z that is suitably implemented by the system monitor of FIG. 1.
Figure 3B:
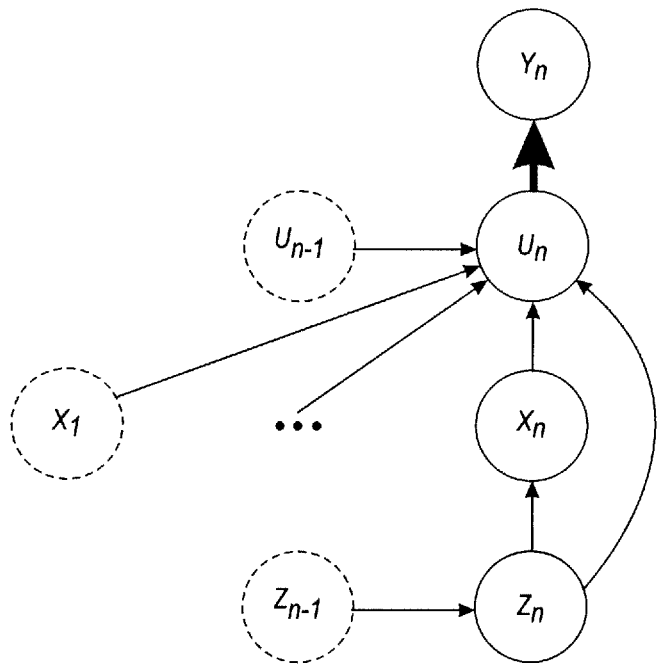
FIG. 3B diagrammatically shows the nonstationary autoregressive model of FIG. 3A, in which the time sequence of responses is represented as a conditional Markov chain, conditioned on the sequence of events as well as a sequence of hidden states.

With returning reference to FIG. 1 and with further reference to FIGS. 3A and 3B, in other embodiments the autoregressive model 20 is a nonstationary autoregression model. In these embodiments, the parameters of the autoregression model are selected at each step among a finite set of alternatives determined by the discrete latent state 24 (denoted herein as the discrete latent state Z), which has Markovian dynamics underlying the emission of the events $X_n$ (which are again assumed to be fully observed). Thus, the nonstationary autoregression model adapts to the "regime" of the event time series, which reflects the regime of a monitored system. That adaptive model is parameterized as follows:

$$p(Z_n | Z_{n-1}) = \phi_Z(Z_{n-1}, Z_n) \tag{7},$$

$$p(X_n | Z_n) = \phi_X(Z_n, X_n) \tag{8},$$

and $$p(Y_n | Z_n, X_{1:n}, Y_{1:n-1}) = \phi_Y(X_{1:n}, Z_n, Y_{n-r:n-1}, Y_n) \tag{9}.$$

Let Z be the latent state space. Equations (1a), (1b), (2), and (3) then become:

$$p(Y_n = y, Y_I | X_{1:N}) = \sum_{z \in Z, u \in \mathcal{Y}^{\delta_n}, last(u) = y} \frac{p(Z_n = z, U_n = u^{(n)}, Y_I, X_{1:N})}{\alpha_n(u,z)\beta_n(u,z)}, \tag{10}$$

$$\alpha_n(u,z) =_{def} p(Z_n = z, U_n = u^{(n)}, Y_{(1:n) \cap I} | X_{1:N}) \tag{11},$$

and $$\beta_n(u,z) =_{def} p(Y_{(1:n) \cap \bar{I}}, X_{n+1:N} | Z_n = z, U_n = u^{(n)}, Y_{1:n}, X_{1:n}) \tag{12}.$$

The main difference of Equations (10), (11), and (12) as compared with Equations (1a), (1b), (2), and (3) is that the non-normalized score now accounts for the probability of $X_{1:N}$ (instead of it being given), and $\alpha_n$, $\beta_n$ become matrices, of dimension $\mathcal{Y}^{\delta_n} \times Z$, while the transition matrix of Equation (4) now becomes a four-dimensional tensor of dimensions $\mathcal{Y}^{\delta_{n-1}} \times Z \times \mathcal{Y}^{\delta_n} \times Z$ given by:

$$\begin{aligned} w_n(u, z, u', z') &=_{def} p(U_n = u^{(n)} | Z_n = z', U_{n-1} = u^{(n-1)}, \\ &\quad Y_{(1:n-1) \cap I}, X_{1:n}) \cdot \\ &\quad p(X_n | Z_n = z') p(Z_n = z' | Z_{n-1} = z) \\ &= II\{u_{1:r-1}^{(n)} = u_{2:r}^{(n-1)}\} \phi_Y(x_{1:n}, z', u^{(n-1)}, u_r^{(n)}) \\ &\quad \phi_X(z', x_n) \phi_Z(z, z'). \end{aligned} \tag{13}$$

The propagations given by Equation (5) and (6) are unchanged.

Operation of the event handling module 30 and the true label handling module 32 for the embodiments employing an adaptive nonstationary regressive model is similar to those embodiments employing a stationary regressive model, with certain differences as set forth in the following. When a new event is received, a new node is created using the EXPAND routine 40 as before, but here the $\beta_n$ score matrices are revised by a downward propagation. Indeed, the observation of a new event, even before its true label is revealed, may change the belief about the latent states in the preceding nodes, and hence revise the belief about the previous unknown labels (that is, the previous predicted labels). On the other hand, the enhanced computational efficiency variant of Algorithms (E2) and (R2) can be used, in which only the important nodes, that is, the nodes with unknown labels, are retained in the set of nodes 26.

In the nonstationary embodiments, it is theoretically never possible to "break the chain" of nodes into independent segments, since the score matrices $\alpha_n$, $\beta_n$ are never reduced to scalars: even if $\delta_n$ is nullified, they remain of dimension Z. One contemplated approach is to discard "old" nodes of the set of nodes 26, employing a suitable metric of age. Such deletion is analogous to deleting a node whose true label has been revealed, as performed in the approach of Algorithms (E2) and (R2). The knowledge about the label is frozen, although not through the revealing of the true label. If the true label is later revealed, the system rejects this information for nodes thus discarded.

The illustrative embodiments relate to system monitoring. However, it will be appreciated that the disclosed techniques are generally applicable wherever a time sequence of events is to be monitored with the purpose of generating predicted labels for newly observed events. For example, the disclosed techniques may be useful in applications such as control systems (where the events may include feedback signals and the predicted labels comprise control commands), automated news monitoring (where the events may include received news articles represented as document keywords or so forth, and the predicted labels may include either "do nothing", that is, ignore the article, or "investigate", that is, flag the article for review by a human reviewer), security monitoring (where the events may include various automated and/or manual inputs having the potentiality to be indicative of a security threat and the labels again may include either "do nothing" or "investigate", or in a variant system several progressively more urgent "investigate" levels), and so forth.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. An apparatus operating on a time sequence of events, the apparatus comprising:
an event handling module configured to generate a predicted label for a current observed event of the time sequence of events; and
a true label handling module configured to process a true label revealed for an observed event of the time sequence of events;
wherein the event handling module and the true label handling module operate asynchronously, are embodied by one or more digital processors, and cooperatively model stochastic dependence of a true label for the current observed event based on observed events of the time sequence of events and any true labels revealed for r past observed events of the time sequence of events.

2. The method as set forth in claim 1, wherein the predicted label and the true label are discrete class labels.

3. The apparatus as set forth in claim 1, wherein the cooperative modeling includes generating nodes corresponding to past observed events of the time sequence of events for which the true labels have not yet been revealed, and the true label handling module responds to a revelation of a true label for a past observed event by a process including removing the node corresponding to the past observed event.

4. The apparatus as set forth in claim 3, wherein the process by which the true label handling module responds to a revelation of a true label for a past observed event further includes propagating information of the removed node to other nodes corresponding to neighboring events in the time sequence of events.

5. The apparatus as set forth in claim 4, wherein the true label handling module propagates information of the removed node to other nodes corresponding to neighboring events in the time sequence of events using a forward-backward algorithm.

6. The apparatus as set forth in claim 3, wherein information of the nodes is stored in a state space whose dimensionality scales with a number of past observed events whose true labels have not yet been revealed.

7. The apparatus as set forth in claim 1, wherein the model comprises a stationary autoregressive model of order r.

8. The apparatus as set forth in claim 1, wherein the model comprises a nonstationary autoregressive model of order r that evolves through a discrete latent state configured to emit events.

9. The apparatus as set forth in claim 8, wherein the nonstationary autoregressive model comprises a hidden Markov model (HMM).

10. The apparatus as set forth in claim 1, wherein the apparatus comprises a system monitor and the predicted and true labels are binary labels, and the predicted and the true labels have values selected from a binary group of values consisting of (i) a value corresponding to an investigation response and (ii) a value corresponding to a response of doing nothing.

11. A non-transitory computer readable storage medium storing instructions executable on a digital processor to perform a method of modeling stochastic dependence of a true label of a current observed event of a time sequence of events using an autoregressive model of order r wherein the method includes performing an operation (i) comprising adding a node corresponding to a current observed event to the autoregressive model and generating a predicted label for the current observed event using the autoregressive model and performing an operation (ii) comprising removing a node of the autoregressive model corresponding to a past observed event for which a true label is revealed and propagating information of the removed node to other nodes of the autoregressive model, wherein the operations (i) and (ii) are performed asynchronously.

12. The non-transitory computer readable storage medium as set forth in claim 11, wherein the instructions are executable to model stochastic dependence of a true label of a current observed event of a time sequence of events using an autoregressive model of order r based on observed events of the time sequence of events and any true labels revealed for r past observed events of the time sequence of events.

13. The non-transitory computer readable storage medium as set forth in claim 11, wherein the nodes of the autoregressive model are represented as a conditional Markov chain of events.

14. The non-transitory computer readable storage medium as set forth in claim 11, wherein the autoregressive model comprises a stationary autoregressive model.

15. The non-transitory computer readable storage medium as set forth in claim 11, wherein the autoregressive model comprises a nonstationary autoregressive model.

16. The non-transitory computer readable storage medium as set forth in claim 11, wherein the operation (ii) uses a forward-backward algorithm for propagating information of the removed node to other nodes of the autoregressive model.

17. The non-transitory computer readable storage medium as set forth in claim 11, wherein information of the nodes is stored in a state space whose dimensionality scales with a number of past observed events whose true labels have not yet been revealed.

18. A method operating on a time sequence of events, the method comprising:
   (i) generating a predicted label for a current observed event of the time sequence of events; and
   (ii) processing a true label revealed for an observed event of the time sequence of events;
   wherein the operations (i) and (ii) cooperatively maintain an autoregressive model of order r of the time sequence of events including the current observed event, past observed events, and revealed true labels for past observed events; and
   wherein the operation (i) generates the predicted label for the current observed event without requiring that the true labels for all past observed events have been revealed; and
   wherein the operations (i) and (ii) are performed by a digital processor.

19. The method as set forth in claim 18, wherein the operations (i) and (ii) cooperatively maintain a stationary autoregressive model of order r.

20. The method as set forth in claim 18, wherein the operations (i) and (ii) cooperatively maintain a nonstationary autoregressive model of order r.

21. The method as set forth in claim 18, wherein the autoregressive model employs a node representation, and the operation (i) comprises adding a node to the autoregressive model corresponding to the current observed event and the operation (ii) comprises: (ii)(a) removing a node corresponding to a past observed event whose true label is revealed and (ii)(b) propagating information from the removed node to other nodes of the node representation.

* * * * *